United States Patent [19]

Bloxham et al.

[11] 3,927,272

[45] Dec. 16, 1975

[54] AUTOMATIC CIRCUIT FOR PROVIDING EMERGENCY GROUND START SIGNALS ON PBX TRUNKS

[75] Inventors: Glen Lee Bloxham, Murray; Don Charles Wells, Midvale, both of Utah

[73] Assignee: American Telephone and Telegraph Co., New York, N.Y.

[22] Filed: June 19, 1974

[21] Appl. No.: 480,726

[52] U.S. Cl. ......................... 179/18 AD; 179/27 CA
[51] Int. Cl.[2] ......................................... H04M 7/00
[58] Field of Search ......... 179/18 AD, 16 E, 16 EA, 179/16 A, 16 AA, 18 GF, 27 CA; 317/148.5 B; 307/252 H, 252 J

[56] References Cited

UNITED STATES PATENTS

| | | | |
|---|---|---|---|
| 3,386,013 | 5/1968 | Hirsch | 307/252 H |
| 3,506,789 | 4/1970 | Brockschmidt et al. | 179/18 AD |
| 3,721,768 | 3/1973 | Mazac et al. | 179/18 AD |
| 3,737,732 | 6/1973 | Suemasa et al. | 317/148.5 B |

*Primary Examiner*—Thomas A. Robinson
*Attorney, Agent, or Firm*—F. W. Padden; C. H. Davis

[57] ABSTRACT

A circuit is disclosed for providing automatic ground start signals for a private branch exchange (PBX) telephone station equipped for automatic cut-through to a central office trunk in the event of a local power failure. The circuit comprises circuitry for generating a time interval in response to a detection of an off-hook condition of the station and apparatus activated upon the expiration of the time interval for applying a ground signal to the tip conductor of the trunk for initiating central office dial tone switching operations. Thereafter, the circuit senses a momentary open condition of the trunk caused by central office dial tone switching operations and responds by electrically isolating itself from the trunk so as not to interfere with subsequent call operations.

15 Claims, 2 Drawing Figures

AUTOMATIC CIRCUIT FOR PROVIDING EMERGENCY GROUND START SIGNALS ON PBX TRUNKS

BACKGROUND OF THE INVENTION

Our invention relates to automatic ground start circuitry for communication systems and more particularly to an automatic ground start circuit for use at a telephone private branch exchange installation.

It is common practice to provide at many telephone exchanges an auxiliary or standby power source which may be activated in the event of a failure of the normal power source such as may result, for example, from a malfunction of the public power distribution network which is serving the exchange area. With such auxiliary facilities the exchange may continue to function during such power failures and, indeed, this ability has proved to be invaluable on many occasions.

Considerable expense is obviously involved in the auxiliary power equipment; and for this reason primarily, it is not usually feasible to provide such equipment in smaller installations, for example in a private branch exchange. However, in order that at least limited service will still be available at the PBX in the event of a power failure, it is common practice to provide means at the PBX whereby, in the event of such happening, one or more predesignated stations of the PBX will be cut through directly to the central office where power source is available.

The means referred to above commonly comprises a "power" relay which is normally held operated by the PBX power source and which, while so operated, closes paths for connecting the station, when it is off-hook, through the normal PBX circuits and via a ground start trunk to the central office. Should the power fail, the relay releases, opens the path to the normal PBX circuits and the ground start trunk, and closes a path for connecting the station directly to the central office.

Since during the above emergency situation, the PBX exchange ground start circuitry has been eliminated from the connection to the central office, other means must be provided for initiating the start ground to the central office. Accordingly, it has been the practice to provide at the station a manually actuateable nonlocking key which, when closed, connects start ground to the ring lead of the trunk. Thus, a customer after removing the telephone receiver to its off-hook state to initiate a call, is required to actuate the key and hold it actuated until dial tone is received from the central office. Thereafter, the desired called number is transmitted from the calling telephone in the usual manner. However, it has been found in actual practice that the manual arrangement has not been entirely satisfactory since the customer often fails to operate the key at all or to hold it closed for a sufficient period of time. Such omissions on the part of the customer are more likely to occur, of course, under the periods of stress usually prevailing during power failures and similar emergency conditions.

A prior U.S. Pat. No. 3,506,789, issued to R. W. Brockschmidt and R. W. Hutton, Sr. on Apr. 14, 1970, and it discloses an automatic circuit comprising relay logic for providing emergency ground start signals for PBX stations. It is an object of our invention to provide a new and novel circuit arrangement comprising reliable solid-state technology components with minimal drain on central office power and requiring less equipment space while furnishing ground start signals automatically during emergency power condition.

SUMMARY OF THE INVENTION

In accordance with a specific illustrative embodiment of our invention, we provide a simple and reliable circuit for providing ground start signals for a selected PBX station arranged for automatic cut-through to a central office trunk in the event of a local power failure. Our circuit comprises semiconductor switching circuitry operable for applying a ground start signal to the trunk and being thereafter responsive to central office switching operations for terminating ground start signaling operations. The circuit further comprises timing circuitry responsive to an off-hook condition of the station for operating the switching circuitry automatically to perform the ground start operations after a prescribed time interval delay.

To elaborate, our switching circuitry comprises a four-layer diode, commonly referred to as a silicon controlled rectifier (SCR), arranged with anode and cathode electrodes connected between a conductor of the trunk and a PBX ground source. The SCR is switchable to a conduction state for applying a ground potential to the conductor only in response to a signal applied to a gate electrode from the timing circuitry.

SCRs of the type we are using have the advantage that once conduction is established by a gate electrode signal, the rectifier latches into the conducting state and is thereafter unresponsive to gate electrode signals. The conduction state is maintained until the conducting path is interrupted and the current flowing through the rectifier reduced to less than a minimum holding current sufficient to maintain operation of the rectifier. At this time, the rectifier returns to its nonconducting state and is thereafter again subject to gate electrode signals.

Advantageously, we utilize the latching feature for simply and economically terminating ground start signaling operations of the circuit. We have determined that central offices of all types, including crossbar, step-by-step and electronic switching, introduce a momentary open condition into a trunk loop while performing dial tone switching operations. A number of sample measurements we have taken indicate that the duration of this open loop condition varies between 40 and 175 milliseconds, which is many times greater than the switch-off time required by silicon controlled rectifiers. Accordingly, our circuit, once activated and latched, applies and automatically maintains a ground potential on the trunk conductor through the latched rectifier until such time as the central office recognizes the trunk seizure and proceeds to establish dial tone. The momentary open condition of the trunk, which occurs during central office dial tone operations, temporarily removes central office potential on the trunk and is effective for ceasing the flow of loop current and returning the rectifier to its nonconducting state.

It is known that trunks are often subject to spurious signals and voltages resulting from such phenomena as atmosphere conditions and central office switching operations. A circuit arranged without suitable protection against such signals and voltages would be subject to false operations and hence would interfere with normal central office operations. To preclude such undesired operation, we advantageously provide a timing circuitry for detecting an apparent station off-hook signal and for operating the aforementioned SCR switching circuitry only after a prescribed time interval of such duration as to reduce such false operations.

Our timing circuitry comprises a transistor arrangement operable for activating the SCR and a combination of zener diodes, resistors and capacitors, which combination provides for sensing the initial off-hook condition of the station and for thereafter providing a prescribed time delay interval before operating the transistor arrangement.

To elaborate, a first zener diode in series connection with a resistor and capacitor is arranged between a conductor of the trunk and a ground source. The zener diode is poled so as to conduct in a zener breakdown mode in response to a negative potential signifying a station off-hook signal and thereby establishes a charging path for the capacitor. A second zener diode connected between the capacitor and base electrode of the transistor arrangement is effective for sensing a prescribed capacitor voltage sufficient in magnitude to force the second zener diode into its breakdown mode. The time between initial off-hook detection and attainment of the prescribed capacitor voltage corresponds to the time delay interval during which valid off-hook signals are distinguished from spurious signals. Resultingly, base current is supplied to the transistor arrangement which, in turn, activates the SCR for applying a ground start signal.

In addition to the foregoing timing and ground signal circuitry, our circuit comprises isolating diodes connecting the circuit to conductors of the trunk and which are effective in conjunction with the aforementioned zener diodes for electrically isolating the circuit from the trunk during conversational modes of the station and for preventing interference with reverse battery supervising signals.

BRIEF DESCRIPTION OF THE DRAWING

The above object and features and others of our invention will be more apparent upon a reading of the following detailed description taken in conjunction with the drawing in which.

DETAILED DESCRIPTION

Figure 1:
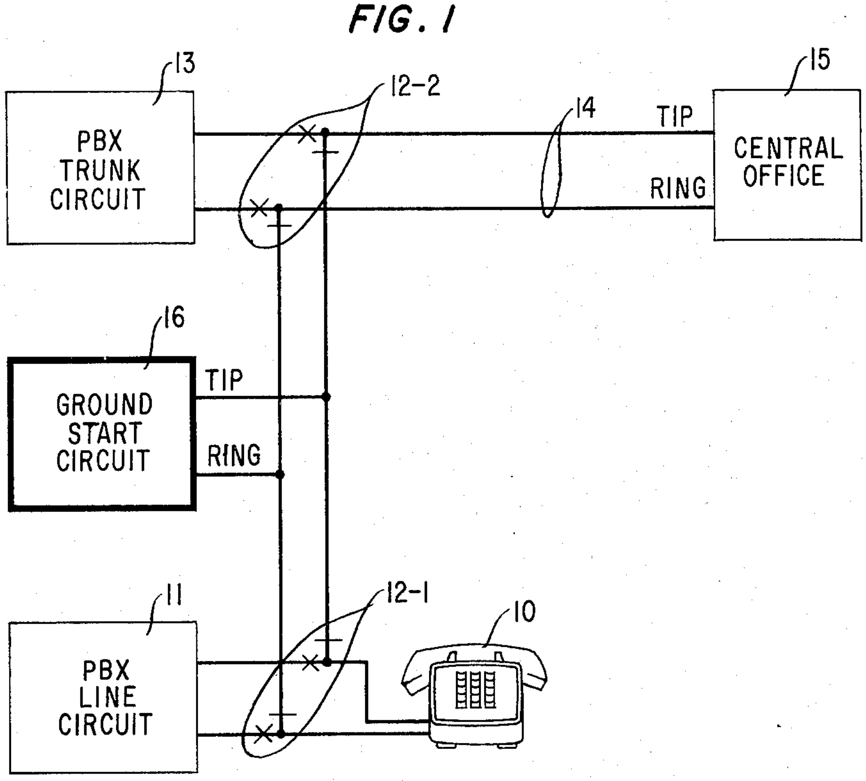
FIG. 1 is a functional block diagram illustrating the arrangement of our invention with regard to other PBX circuits, a central office trunk and a PBX station.

Turning now to FIG. 1, there is illustrated a PBX telephone station 10 equipped for emergency outgoing telephone service in the event of a local power failure. Also shown is a PBX line circuit 11 connectable to station 10 by transfer contacts 12-1 of power relay 12 (not shown) and a PBX trunk circuit 13 connectable by other contacts 12-2 of power relay 12 to tip and ring conductors of a trunk 14 which extend to a central office 15. Power relay 12 is automatically held operated by the local power source and, when operated, connects via its make contacts station 10 to line circuit 11 and further connects trunk 14 to trunk circuit 13 via its operated make contacts. The aforementioned circuits operate in conjunction with other PBX circuits (not shown) and central office 15 for providing station 10 and other PBX stations with incoming and outgoing telephone service.

In the event of a local power failure which renders the PBX system inoperative, the operating voltage for power relay 12 is unavailable. Relay 12 automatically releases and, through its transfer contacts 12-1 and 12-2, automatically disconnects the tip and ring conductors of trunk 14 and station 10 from PBX circuits 13 and 11 while simultaneously connecting station 10 directly to trunk 14 and tip and ring terminations of our illustrative ground start circuit 16 shown in the heavy lined block of FIG. 1. As will be described hereinafter, ground start circuit 16 operates for providing ground start signals for seizing trunk 14 in response to off-hook conditions of station 10. In so doing, ground start circuit 16 utilizes power supplied from central office 15 via tip and ring conductors of trunk 14. Specifically, when trunk 14 is idle (not seized) central office 15 illustratively maintains —48 volts on the ring conductor and an open circuit condition in the tip conductor of trunk 14.

As will be explained in detail, ground start circuit 16 is nonresponsive to a negative voltage applied only to its ring termination, but senses a negative voltage of sufficient magnitude applied to its tip termination from the ring conductor and through station 10 when its handset is removed. In response, ground start circuit 16 initiates action for applying a ground start signal to its tip termination which completes a path including the off-hook resistance of station 10, contacts 12-1 and 12-2 and the ring conductor of trunk 14 to central office 15 for operating a conventional trunk seizure relay (not shown) therein. Thereafter, ground start circuit 16 maintains the start signal until after it senses a momentary open condition in the ring conductor caused by central office 15 dial tone switching operations.

Figure 2:
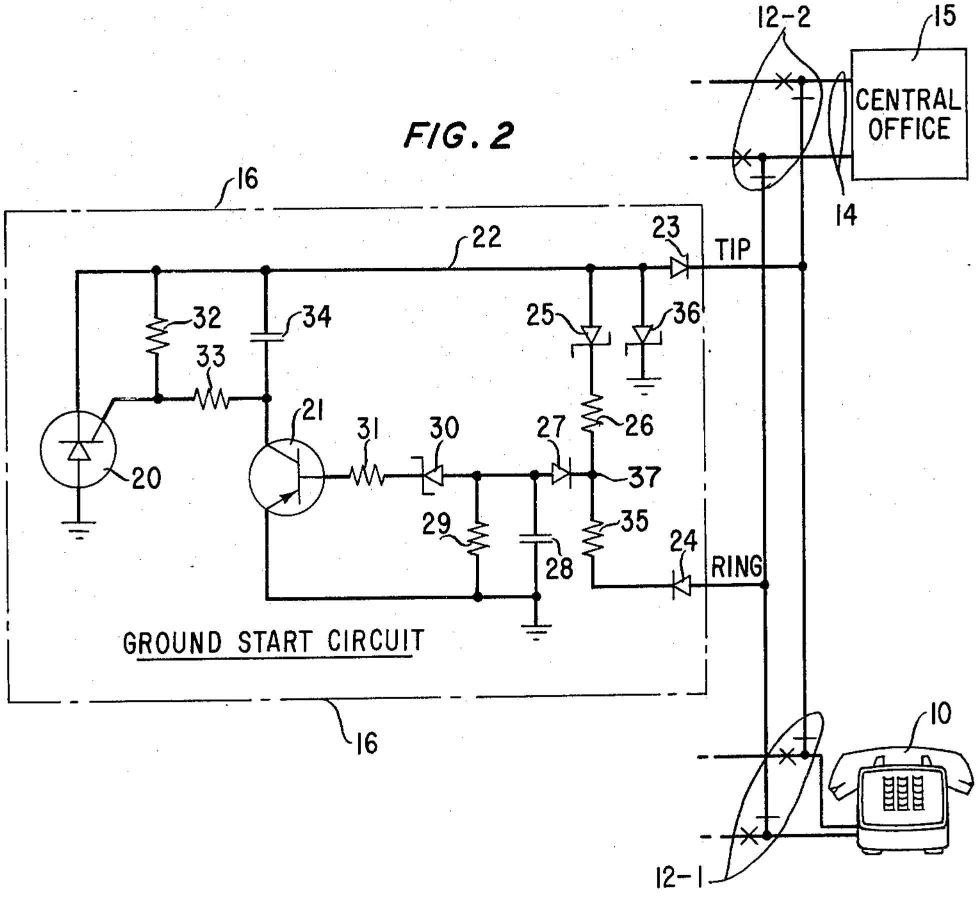
FIG. 2 is a schematic diagram of one illustrative, embodiment of our ground start circuit.

FIG. 2 schematically illustrates our ground start circuit 16 which comprises an SCR 20 operable for controlling a connection of a ground start via a diode 23 to the tip conductor of trunk 14 for seizing that trunk. Circuit 16 also comprises timing circuitry including a PNP transistor 21 and other components in its base electrode biasing network for operating rectifier 20 only after a prescribed time delay interval during which an off-hook signal is continuously received from station 10.

SCR 20 is a latching switch suitably of the type described in pages 1–11 of the Third Edition of the General Electric Silicon Controlled Rectifier Manual. Briefly, the SCR is a four layer unidirectional semiconductor device comprising anode, cathode and gate electrodes. It is nonresponsive to a forward-biasing potential applied between anode and cathode electrodes until after a positive trigger signal is applied to the gate electrode. Thereafter, a SCR latches into a conducting state similar to that of a conventional diode and is no longer responsive to gate electrode signals. Once conducting, the SCR is turned-off by interrupting the current flow path.

Turning now to the operations of circuit 16, when station 10 is on-hook and trunk 14 is in an idle state, central office 15 illustratively supplies —48 volts via the ring conductor of trunk 14 and break contacts 12-2 to the ring termination of ground start circuit 16. Diode 24 is reverse-biased by the —48 volts and isolates ground start circuit 16 from trunk 14 with regard to the ring termination. The tip conductor of trunk 14 is open-circuited at central office 15 and is isolated from the ring conductor and the ring termination of ground start circuit 16 by switch-hook contacts of station 10 in the on-hook state. Under these conditions, circuit 16 remains nonactivated, awaiting an initiation of a call from station 10.

When the latter occurs, the −48 volts on the ring conductor is extended through station 10 to the tip termination of circuit 16 for activating the electrical biasing network in the base circuit of transistor 21.

The tip potential causes a zener diode 25 to conduct in its zener breakdown region and to establish a charging path for a timing capacitor 28 via a timing resistor 26. Concurrently, the tip potential is applied through diode 23 to the cathode of SCR 20. However, rectifier 20 remains nonconductive and awaits a positive signal applied to its gate electrode from transistor 21 after a prescribed time delay interval. This delay interval is determined essentially by the values of resistor 26 and capacitor 28. Following the application of the potential to the tip, the voltage stored in capacitor 28 increases via its charging path including diode 27, resistor 26, zener diode 25 and diode 23, and to a value sufficient to activate zener diode 30 into its zener region for supplying base current drive to transistor 21. As a result, transistor 21 switches on and generates a trigger signal to the gate electrode of SCR 20 for causing it to turn on and latch in its conducting state. Accordingly, a ground potential is applied through SCR 20 and conducting diode 23 to the tip conductor of trunk 14 for operating a trunk seizure-relay in office 15. Thereafter, office 15 performs routine switching operations for connecting dial tone to trunk 14. During such operations, a momentary open condition is conventionally supplied to the ring conductor of trunk 14 and thereby withdraws the −48 volts therefrom for causing a turning-off of SCR 20 to terminate the ground start operations of circuit 16.

To elaborate on the characteristics of our timing circuitry and that of the gate electrode of SCR 20, it is advantageous to note that timing capacitor 28 after the application of the −48 volts to the tip termination begins to charge from an initial value of zero volts towards a voltage determined, by way of example, by a 27 volt drop across zener diode 25 and voltage drops across resistors 26 and 29 as well as diodes 27 and 23. Accordingly, capacitor 28 is charged illustratively toward approximately −18 volts. This voltage is utilized to control zener diode 30 and base current drive for transistor 21. Zener diode 30, resistor 31 and the base-emitter junction of transistor 21 form a circuit in shunt with capacitor 28 and which is activatable when the capacitor 28 charge exceeds the zener characteristic of diode 30 and causes it to conduct in its zener region of approximately −13 volts. Resistor 26 allows capacitor 28 to attain the potential of −13 volts in approximately 300 milliseconds of a time delay interval between receipt of an off-hook signal from station 10 and the application of a ground start signal to trunk 14. The activation of zener diode 30 is effective both for clamping the potential across capacitor 28 to −13 volts and for supplying base current drive for transistor 21. Resultingly, transistor 21 switches-on and draws collector current through a biasing network consisting of resistors 32, 33 and transient suppressing capacitor 34. The collector current of transistor 21 dissipates a sufficient amount of voltage across resistor 32 so that the gate electrode of SCR 20 is biased positive with respect to its cathode. As a result, SCR 20 turns-on and latches into a conducting state, thereby applying a ground potential through diode 23 to the tip conductor trunk 14. The ground extends through off-hook station 10 in FIG. 1 and to central office 15 via the ring conductor of trunk 14 for operating a trunk seizure relay therein. The ground on lead 22 of circuit 16 results in discharging capacitors 28 and 34 through resistors 29 and 32, respectively. In consequence, transistor 21 returns to a nonconducting state and the gate electrode signal of SCR 20 is removed before central office 15 is able to respond to the ground start signal. SCR 20 remains latched in its conducting state until the trunk seizure is recognized and action taken by central office 15 to establish dial tone connections and momentarily to provide a trunk open signal to trunk 14 by withdrawing from SCR 20 the −48 volts on the tip termination thereby to turn-off SCR 20.

Following a ground start operation and during signaling and conversational modes relating to the call from station 10, ground start circuit 16 must necessarily remain deactivated for preventing reapplications of the ground start signal to trunk 14. For this purpose, zener diode 25 is responsive to a reduced potential at the ground start circuit 16 trunk terminals caused by trunk potential drops in office 15 after a trunk seizure for blocking a recharging of timing capacitor 28. Moreover, the diode 24 and resistor 35 connected to the ring termination are provided primarily for preventing ground start signal reapplications which may occur in certain situations when station 10 is placed on-hook. Specifically, such a start signal reapplication could otherwise occur as a result of a station 10 on-hook in the event the on-hook occurred after a reversal of polarity of the trunk potential by office 15 in response to a called party answer. Diode 24 and resistor 35 cooperate with resistor 29 for limiting the voltage across capacitor 28, in this event, to less than the minimum voltage required to activate zener diode 30, thereby to prevent an activation of transistor 21 and a resulting start signal application. This feature is discussed in detail hereinafter.

The foregoing reduction in trunk potential after a seizure of trunk 14 occurs as a result of apparatus in office 15 which is operated as a result of the seizure. Customarily, there is a supervision relay at central office 15 in each of the tip and ring conductors of trunk 14. By way of example, 16 volts of −48 volt loop potential are dropped across each supervisory relay and the remaining voltage is dropped across the resistance of trunk 14 conductors and station 10. The resistance of trunk 14 varies somewhat depending upon the length of trunk 14. As a result, the voltage at the ring termination may vary for particular installations between −32 and −28 volts and the voltage at the tip conductor may vary between −23 and −16 volts relative to ground. With respect to the tip termination at circuit 16, the ring termination is at a negative potential. Accordingly, connecting diodes 23 and 24 are reverse-biased and no current is allowed to flow between tip termination and ring termination. Moreover, the −23 to −16 volts between the tip termination and ground is not sufficient to activate the ground start signal timing circuitry because zener diode 25 requires a minimum of −27 volts in order to breakdown and conduct. Under such circumstances, circuit 16 is electrically isolated from trunk 14.

However, there is a final circumstance to be analyzed to which ground start circuit 16 must be insensitive. That is, to battery reversals which may be placed on trunk 14 by certain types of central offices illustratively in response to called party answer. In this event, reversals of approximately −32 to −28 volts relative to ground will appear at the tip termination of circuit 16. Zener diode 25 conducts at −27 volts applied between its anode and cathode. A charging circuit for capacitor 28 may therefore be established through zener diode 25. The resulting voltage across capacitor 28 can be no greater in magnitude than the voltage applied to the tip termination minus the 27 volts dissipated by zener diode 25, or a maximum of −5 volts. This voltage is insufficient to activate zener diode 30 which illustratively requires a minimum of −13 volts to activate the base electrode circuit of transistor 21. According, SCR 20 is not gated to its conducting state by transistor 21 and no ground start signal results therefrom.

In the event that trunk 14 is in a reverse-battery supervisory state and, in the further event that station 10 goes on hook before reverse-battery is removed from trunk 14, the voltage at the tip termination of ground start circuit 16 will increase to −48 volts temporarily and the ring termination will remain at ground supplied from central office 15 via the ring conductor of trunk 14 until central office 15 responds to the station 10 on-hook. Diode 24 and resistor 35 prevent circuit 16 from generating a ground start signal in response to the −48 volts on the tip termination. Zener diode 25 conducts in response to the −48 volts through resistor 26, diode 27, and the combination of capacitor 28 and resistor 29 to ground. Simultaneously, diode 24 in the ring termination lead of ground start circuit 16 is forward-biased by the ground at its anode and the negative potential at node 37. Effectively, the result is to place resistor 35 in shunt with resistor 29. The value of resistor 35 is chosen in our illustrative exemplary embodiment to reduce the resistance between node 37 and ground to a value such that the voltage dissipated therebetween is insufficient to operate zener diode 30. Accordingly, no gating signal is supplied by transistor 21 for turning-on SCR 20.

Advantageously, circuit 16 presents an impedance to trunk 14 which is sufficiently high enough so as not to degrade the performance of trunk 14 when in supervisory signaling or conversational states. Two possible sources of degradation are possible; first, the circuit path from the tip termination of trunk 14 to ground through diode 23, zener diode 25, resistor 26, diode 27, capacitor 28 and resistor 29; second, the circuit path between the tip and ring terminations to trunk 14 consisting of diode 23, zener diode 25, resistors 26 and 35 and diode 24. Both of these possible sources of interference are negligible when trunk 14 is in both nonreverse-battery and reverse-battery supervisory signaling or conversational modes. That is, circuit 16 presents a sufficiently high impedance to trunk 14 so as not to have adverse effects on the trunk.

With regard to the nonreverse-battery supervisory modes of trunk 14, it was described earlier that the voltages on the tip and ring terminations of circuit 16 are −23 to −16 volts and −32 to −28 volts, respectively, with respect to ground. Insofar as the circuit path between the tip termination and ground is concerned, it was shown earlier that zener diode 25 requires at least −27 volts to place it into a conducting mode and that therefore, the −23 to −16 tip termination voltage to ground is insufficient for zener diode 25 to conduct. Moreover, with regard to the circuit path between tip and ring terminations of ground start circuit 16, the ring termination is biased negative with respect to the tip termination in a nonreverse-battery supervisory mode of trunk 14. Both diodes 23 and 24 are reverse biased and non-conducting. Thus, it is seen that ground start circuit 16 is completely isolated from trunk 14.

We turn to an analysis of the two possible sources of circuit 16 interference with trunk 14 in the event trunk 14 is in a reverse-battery supervisory mode. In this mode, it has been shown that the tip and ring of circuit 16 may vary from −32 to −28 and −23 to −16 volts, respectively, with respect to ground. Zener diode 25 conducts in its zener breakdown mode at −27 volts. Hence, it is possible in the reverse-battery mode of trunk 14 to form a conduction path from the tip termination, through zener diode 25, resistor 26, diode 27, resistor 29 and capacitor 28 to ground. A simple equivalence ratio relating the −27 volts dissipated by zener diode 25 to its effective impedance and as compared to the ratio of the voltage dissipated by the resistor 26 and 29 to their combined series resistance indicates that a worse case impedance is inserted by circuit 16 between its tip termination and ground when a maximum of −5 volts is dissipated across resistors 26 and 29. In this case, the equivalence ratio mentioned above shows that this impedance is approximately equal to six and one-half times the sum of the resistance of resistors 26 and 29. In our illustrative circuit 16, resistors 26 and 29 are chosen such that the resulting effective impedance is sufficiently high so as to prevent negligible loading on the tip conductor of trunk 14.

In the last discussed circumstance, the ring of circuit 16 is electrically isolated from trunk 14 by diode 24 and presents no significant impedance connection between the tip and ring conductors of trunk 14. This is made clear by observing that the voltage at node 37 can be no greater than −5 volts; hence, the −23 to −16 volts on the ring termination reverse-biases diode 24.

It is to be understood that hereinbefore described arrangements are illustrative of the principles of our invention. In light of this teaching, it is apparent that numerous other arrangements may be devised by those skilled in the art without departing from the spirit and scope of our invention.

What is claimed is:

1. In a private branch exchange telephone system arranged for connecting a station directly to a central office trunk for providing outward emergency telephone service during trouble periods of the private branch exchange, the invention comprising circuitry connected to said trunk for notifying a central office of a request for service from said station, said circuitry comprising timing means operated in response to a request for service from said station for generating a prescribed time interval, and means responsive to said operated timing means upon an expiration of said time interval for applying a start signal to said trunk to inform the central office of the request for service.

2. The invention of claim 1 wherein said applying means comprises means responsive to a subsequent momentary open condition on said trunk from said central office for removing said start signal from said trunk.

3. The invention of claim 1 wherein said circuitry further comprises activating means responsive to a prescribed trunk potential of a first polarity for operating said timing means and responsive to another trunk potential of said first polarity for blocking an operation of said timing means.

4. The invention of claim 3 wherein said circuitry further comprises means responsive to a coincidence of a service completion signal from said station and a trunk potential of a second polarity for disabling an operation of said timing means.

5. The invention of claim 3 wherein said timing means comprises means responsive to said activating means for producing an output signal increasing in level as a function of time, and threshold means responsive to a first level of said output signal for causing an operation of said applying means and responsive to a second level of said output signal coincident to a polarity reversal of said trunk for inhibiting an operation of said timing means.

6. In a telephone system, a private branch exchange, a central office, a trunk comprising tip and ring conductors connecting the private branch exchange to the central office during a first condition, a private branch exchange telephone station, and means connecting the station to the trunk exclusive of the private branch exchange during a second condition, the invention comprising circuitry connectable to said tip and ring conductors for notifying the central office of a request for service received from said station during said second condition, comprising means responsive to a signal signifying an off-hook condition of said station for generating a prescribed time interval, means activated upon expiration of said interval for controlling an application of a start signal to said trunk for informing the central office of the off-hook condition of said station, and means responsive to an open circuit condition on said trunk for controlling a removal of said start signal from said trunk.

7. A circuit for use in a telephone system, the system including a private branch exchange, a central office, a trunk comprising first and second conductors connecting the private branch exchange to the central office, a station, means connecting said station directly to said trunk exclusive of the exchange during trouble conditions of the exchange for providing emergency telephone service therefrom, said circuit being operative for automatically generating a ground start signal on said trunk in response to an off-hook condition of said station, and comprising timing means responsive to a potential on said first conductor and received through said off-hook station from said central office via said second conductor for generating a prescribed time delay, and means activated by said timing means upon the expiration of said delay for applying a ground start signal to said first conductor to inform the central office of the off-hook condition, said applying means being operative for holding an application of the start signal on said first conductor only until the central office responds to the start signal, said applying means being further responsive to an open trunk signal from said central office for removing the ground start signal from said first conductor.

8. A circuit for use in a private branch exchange telephone system to generate emergency ground start signals over a trunk extending directly between a central office and a private branch exchange station, comprising means operable for applying a ground start signal to said trunk, timing circuitry responsive to an off-hook signal from said station for initiating a generation of a timing interval, and means activated upon the expiration of said timing interval for operating said applying means to apply said ground start signal to said trunk.

9. The invention of claim 8 wherein said applying means comprises a semiconductor switching device responsive to the activation of said operating means for connecting a ground start signal to said trunk, said device being further responsive to an open signal from said trunk for disconnecting said ground start signal from said trunk.

10. The invention of claim 9 wherein said trunk comprises tip and ring conductors and wherein said semiconductor device comprises a four layer diode including anode and cathode electrodes connectable intermediate said tip conductor and a source of ground and a gate electrode connected to said operating means, and wherein said operating means includes a transistor having collector, emitter and base electrodes, said collector electrode being connected to said gate electrode and said emitter electrode being connected to a source of ground; and wherein said timing circuitry includes a resistor-capacitor arrangement connectable between said tip conductor and said base electrode and being responsive to said off-hook signal for generating said timing interval.

11. The invention of claim 10 wherein said circuit further comprises a biasing network including a first resistor connectable between said tip conductor and said gate electrode, a second resistor connected between said gate electrode and said collector electrode and a capacitor connectable between said tip conductor and said collector electrode.

12. The invention of claim 10 wherein said operating means further comprises a serially connected resistor-zener diode arrangement intermediate said base electrode and said resistor-capacitor arrangement and being responsive to a prescribed voltage across a capacitor of said resistor-capacitor arrangement for activating said transistor upon expiration of said timing interval.

13. The invention of claim 10 wherein said circuit further comprises a zener diode responsive to a voltage on said tip conductor signifying said off-hook signal for connecting said tip conductor to said resistor-capacitor arrangement to initiate generation of said timing interval.

14. The invention of claim 10 wherein said circuit further comprises a pair of oppositely poled diodes connecting said circuit to said tip and ring conductors and being effective for blocking entry of spurious voltages into said circuit.

15. The invention of claim 14 wherein said circuit further comprises a zener diode connected between a source of ground and said tip conductor via one of said oppositely poled diodes and being effective for limiting the magnitude of spurious signals applicable to said resistor-capacitor arrangement and said four-layer diode.

* * * * *